US012404065B2

(12) United States Patent
Bardini

(10) Patent No.: US 12,404,065 B2
(45) Date of Patent: Sep. 2, 2025

(54) LABELING MACHINE

(71) Applicant: P.E. LABELLERS S.P.A., Porto Mantovano (IT)

(72) Inventor: Riccardo Bardini, Torri del Benaco (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 140 days.

(21) Appl. No.: 18/278,919

(22) PCT Filed: Sep. 16, 2021

(86) PCT No.: PCT/EP2021/075457
§ 371 (c)(1),
(2) Date: Aug. 25, 2023

(87) PCT Pub. No.: WO2022/184290
PCT Pub. Date: Sep. 9, 2022

(65) Prior Publication Data

US 2024/0051699 A1 Feb. 15, 2024

(30) Foreign Application Priority Data

Mar. 2, 2021 (IT) ........................ 102021000004820

(51) Int. Cl.
*B65C 9/18* (2006.01)
*B26D 1/40* (2006.01)
(Continued)

(52) U.S. Cl.
CPC ............ *B65C 9/1819* (2013.01); *B26D 1/405* (2013.01); *B26D 7/2614* (2013.01); *B65C 9/02* (2013.01); *B65C 2009/1838* (2013.01)

(58) Field of Classification Search
CPC .................. B26D 7/2614; B26D 1/626; B26D 2007/2685; B65C 2009/1838
See application file for complete search history.

(56) References Cited

U.S. PATENT DOCUMENTS 4,640,165 A * 2/1987 McMahon ........... B26D 7/2614 83/346
4,848,202 A 7/1989 Crampton
(Continued)

FOREIGN PATENT DOCUMENTS

EP 1410420 A1 4/2004
JP H0489698 U 8/1992
(Continued)

OTHER PUBLICATIONS

International Search Report and Written Opinion issued Dec. 16, 2021 which pertains to PCT Patent Application No. PCT/EP2021/075457 filed Sep. 16, 2021. 10 pages.
(Continued)

*Primary Examiner* — Carson Gross
(74) *Attorney, Agent, or Firm* — THOMPSON HINE LLP

(57) ABSTRACT

A labeling machine includes a conveyor of containers to be labeled along an advancement path and at least one labeling station. The labeling station includes an unreeling assembly for a label ribbon, and a cutting drum. At least one cutting device is provided and has a respective suction chamber, which accommodates internally a blade. The suction chamber is connectable with an air suction device, in order to attract the label ribbon toward the inside of the suction chamber and against the blade, in order to cut the label ribbon. The cutting device includes a respective blade supporting element which is coupled to the cutting drum and supports the blade. This blade supporting element is elastically deformable in order to allow the coupling/uncoupling of the blade to/from the blade supporting element.

9 Claims, 4 Drawing Sheets

(51) Int. Cl.
*B26D 7/26* (2006.01)
*B65C 9/02* (2006.01)

(56) References Cited

U.S. PATENT DOCUMENTS

| | | | | |
|---|---|---|---|---|
| 5,224,408 | A * | 7/1993 | Steidinger ............ | B26D 7/2628 83/346 |
| 6,207,001 | B1 | 3/2001 | Steidinger et al. | |
| 2017/0081070 | A1* | 3/2017 | Bardini ...................... | B65C 9/32 |

FOREIGN PATENT DOCUMENTS

| | | | |
|---|---|---|---|
| JP | 2004114302 | A | 4/2004 |
| JP | 2016028843 | A | 3/2016 |
| JP | 2017520482 | A | 7/2017 |
| WO | 2011/012925 | A1 | 2/2011 |
| WO | 2015/173091 | A1 | 11/2015 |

OTHER PUBLICATIONS

Japanese Patent Office, Notice of Reasons for Refusal issued in Japanese Patent Application No. 2023-553416 on Mar. 11, 2025; 8 pages.

* cited by examiner

LABELING MACHINE

The present invention relates to a labeling machine.

Labeling machines are known which make it possible to apply, on containers, labels that are obtained by cutting a continuous label ribbon which is taken from a reel on which a plurality of labels are printed in succession.

The label ribbon can be provided with strips of glue pre-applied to the face thereof that is intended to come into contact with the containers, or it can be without glue and, in this case, the machine is provided with a gluing unit, which is designed to apply the glue on the labels.

Generally, labeling machines comprise a conveyor, typically constituted by a rotating carousel, that transports the containers to be labeled along an advancement path, and at least one labeling station, which is designed to apply the labels to the containers in transit on the conveyor and which is usually provided with an unreeling assembly, which is designed to take the label ribbon from its reel and to feed it to a rotating cutting drum, which is designed to receive the label ribbon so that it adheres to its own lateral surface.

In some labeling machines, the cutting drum is provided with blades that are integral therewith, and which, by interacting with a stationary blade placed laterally to the cutting drum, make it possible to perform the cut of the label ribbon at the separation region between two labels consecutive.

The labels separated after cutting are then transferred from the cutting drum to a transfer drum which places them so that they adhere on the respective container arriving on the carousel.

The cutting drum described above has the drawback that it requires a precise adjustment of the position of the blades that are integral with the cutting drum relative to the stationary blade, in order to ensure the correct execution of the cutting of the labels.

In other labeling machines, the cutting drum is provided with blades that are made to move by respective working cylinders, in order to allow the cutting of the label ribbon to be carried out without requiring the presence of the stationary blade.

In this case, the cutting drum also transfers the label, separated after cutting, directly to the corresponding container and is, therefore, more correctly termed "cutting and transfer drum".

These latter machines, although they have fewer problems with adjusting the blades, do however feature a greater complexity of construction over the machines described previously.

In order to overcome these and other drawbacks in the known art, a labeling machine has been proposed, described in Italian patent no. 1423941, in the name of this same applicant, in which the cutting drum is provided, along its perimeter, with a plurality of cutting devices, which are angularly mutually spaced apart and are each constituted by a respective blade which is integrally fixed to the cutting drum and accommodated in a respective suction chamber which is defined inside the cutting drum and is open at the lateral surface of the cutting drum.

The suction chamber of each cutting device can be connected to air suction means, so as to enable the attraction, toward the inside of the suction chamber, of the portion of the label ribbon that in each instance is directed toward the suction chamber, so as to be able to push it against the blade, thus providing the cutting thereof.

The machine just described, although it does not necessitate any operation to adjust the position of the blades and it is simple to provide in terms of construction, entails a certain inconvenience in operations to replace the blades, once they are worn.

In particular, extracting the blades from the suction chamber is quite a complex task, and consequently the time required to carry out this operation is rather long.

The aim of the present invention is to provide a labeling machine that is capable of improving the known art in one or more of the above mentioned aspects.

Within this aim, an object of the invention is to provide a labeling machine that does not require exact adjustments of the blades and which at the same time allows their simple and convenient replacement.

Another object of the invention is to provide a labeling machine that in terms of construction is simple to provide.

Another object of the present invention is to provide a labeling machine that can offer the widest guarantees of reliability and safety in its operation.

A further object of the present invention is to overcome the drawbacks of the background art in a manner that is alternative to any existing solutions.

Another object of the invention is to provide a labeling machine that can be produced at low cost, so as to be competitive from a purely economic viewpoint as well.

This aim and these and other objects which will become better apparent hereinafter are achieved by a labeling machine according to claim 1, optionally provided with one or more of the characteristics of the dependent claims.

Further characteristics and advantages of the invention will become better apparent from the description of a preferred, but not exclusive, embodiment of the labeling machine according to the invention, which is illustrated by way of non-limiting example in the accompanying drawings wherein.

Figure 1:
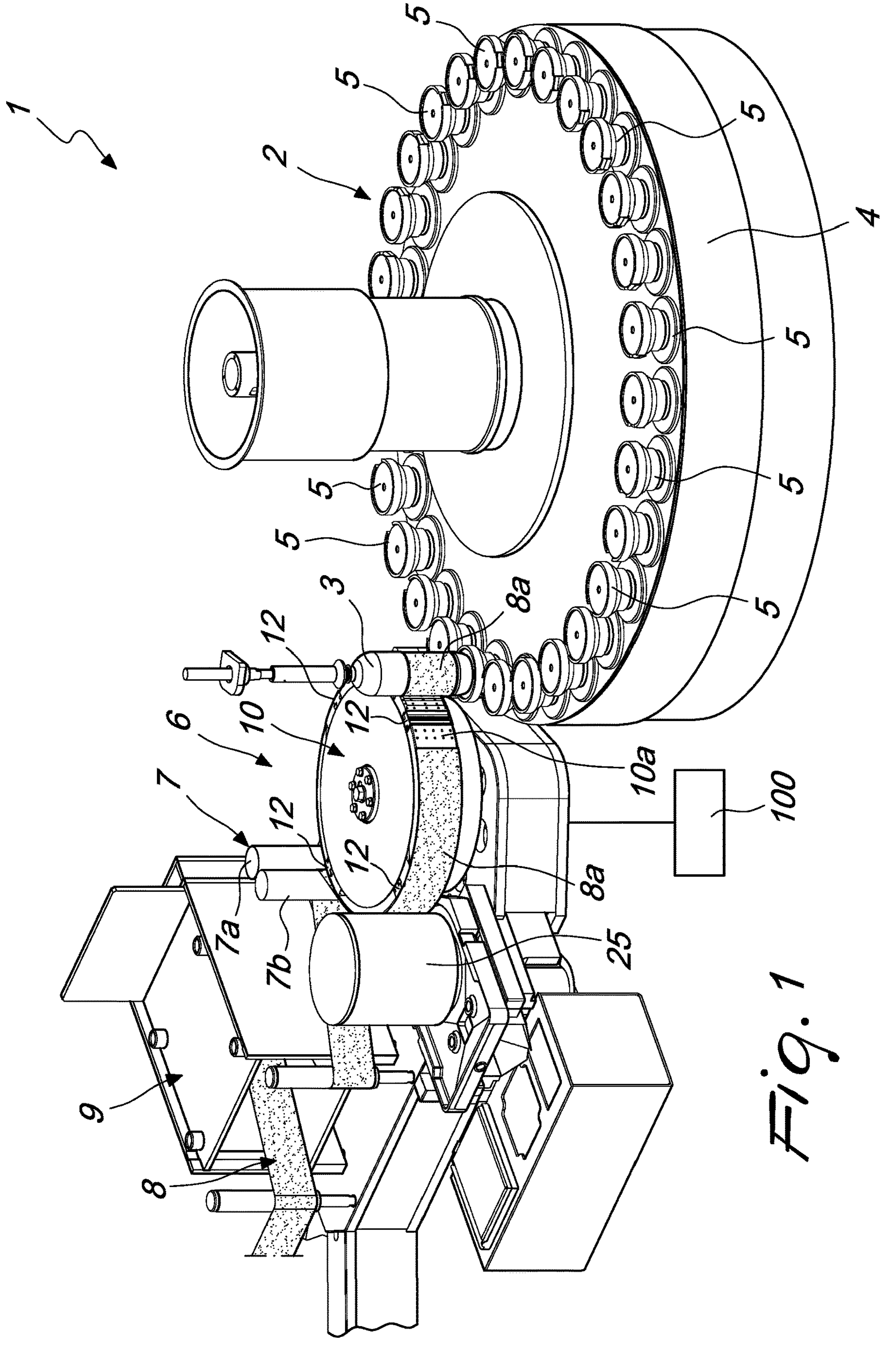
FIG. 1 is a perspective view of the labeling machine according to the invention.
Figure 2:
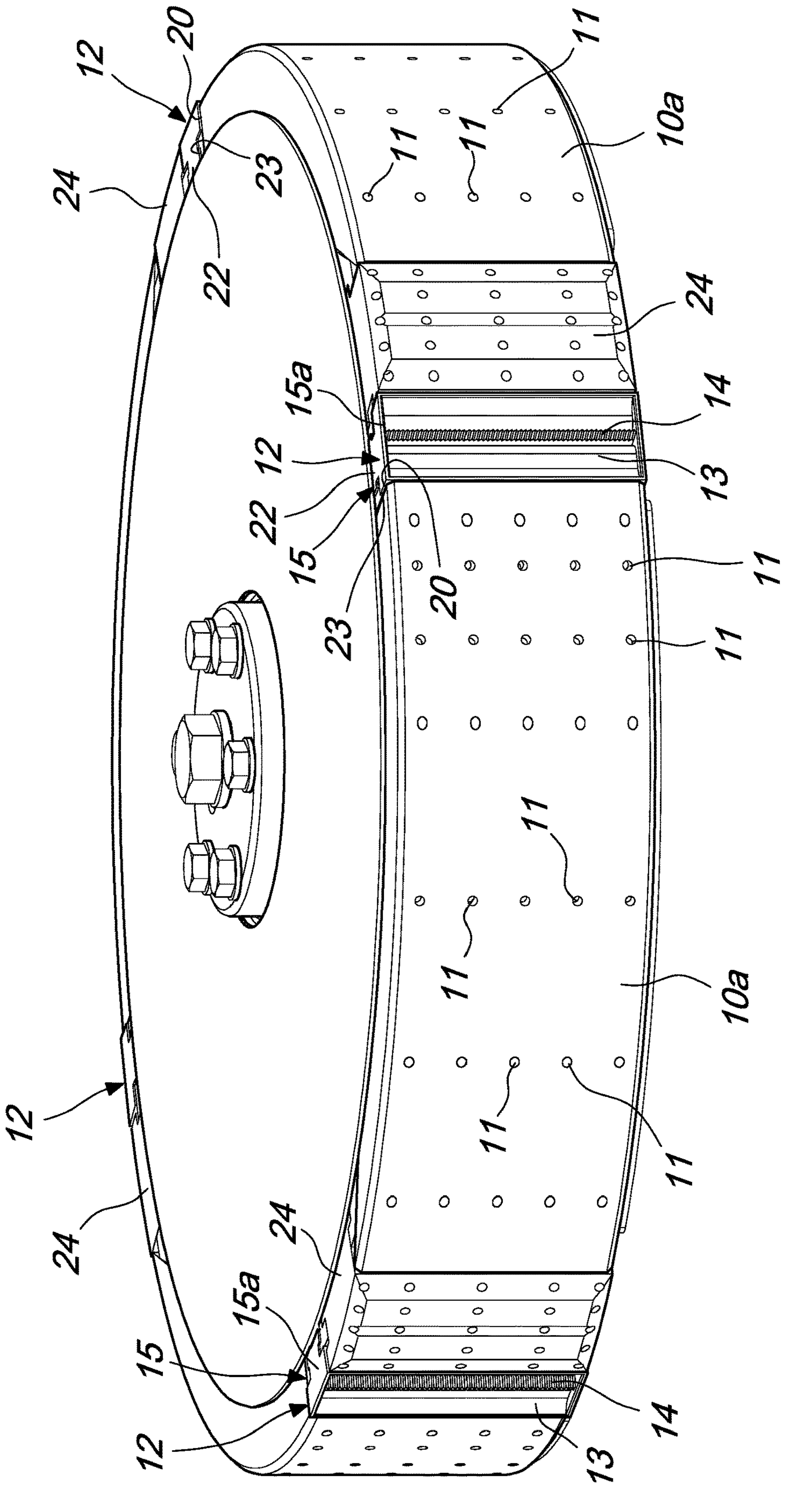
FIG. 2 is a perspective view of a cutting drum of the labeling machine according to the invention.
Figure 3:
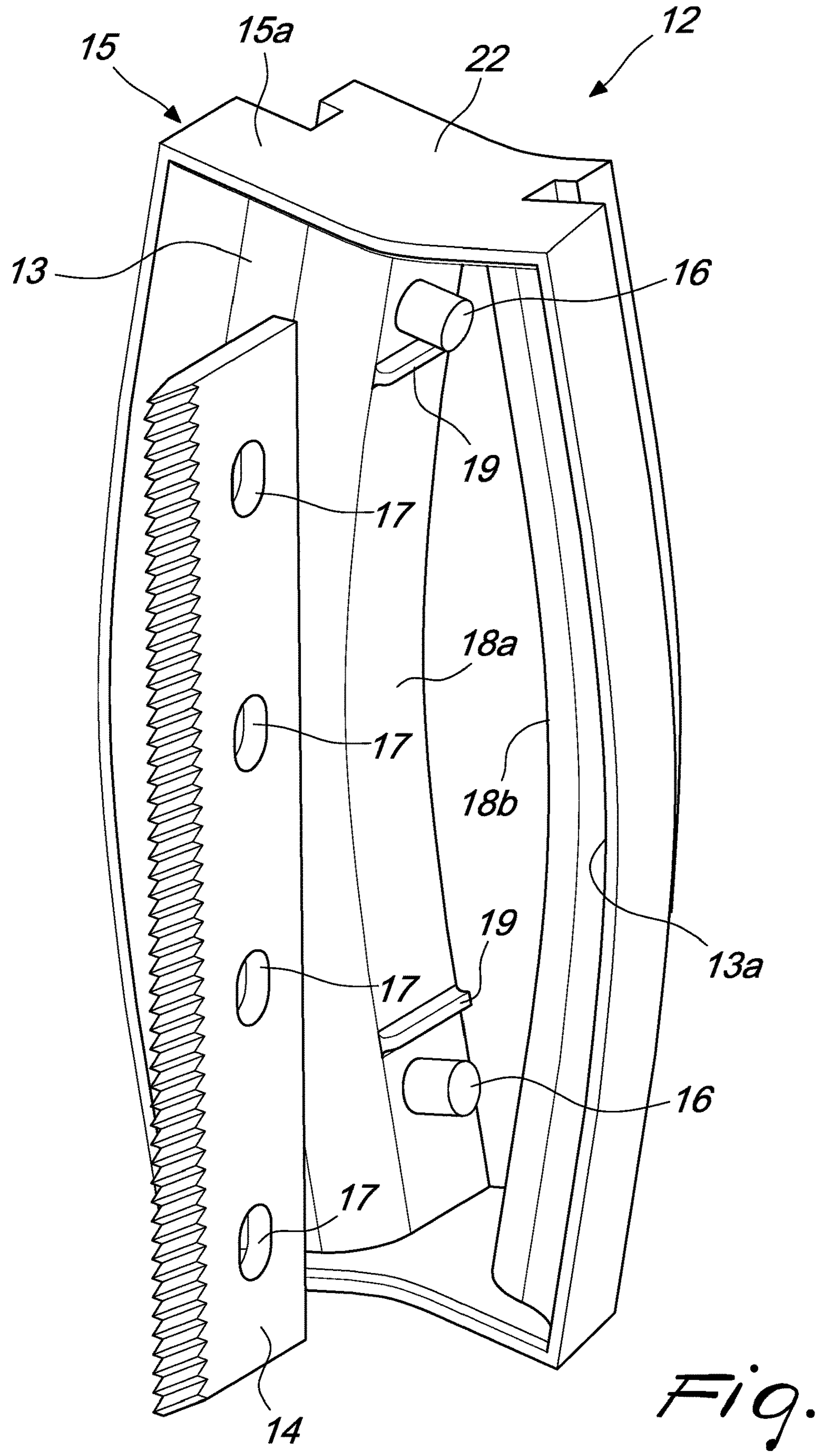
FIG. 3 is an exploded perspective view of a cutting device of the machine according to the invention uncoupled from the corresponding cutting drum and with the blade supporting element in the deformed condition.
Figure 5:
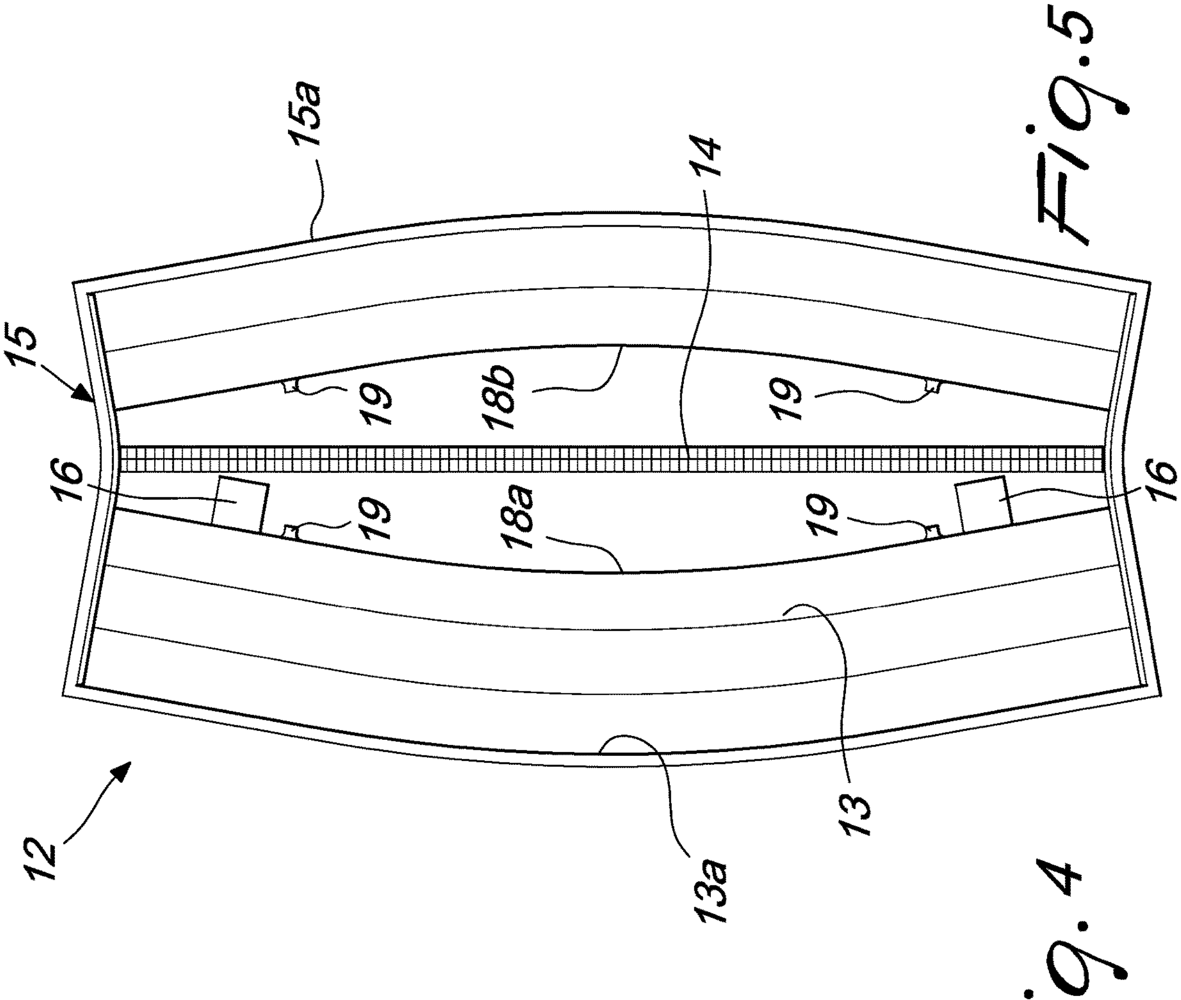
FIG. 5 is a front elevation view of the cutting device uncoupled from the cutting drum with the blade supporting element in the deformed condition.
Figure 4:
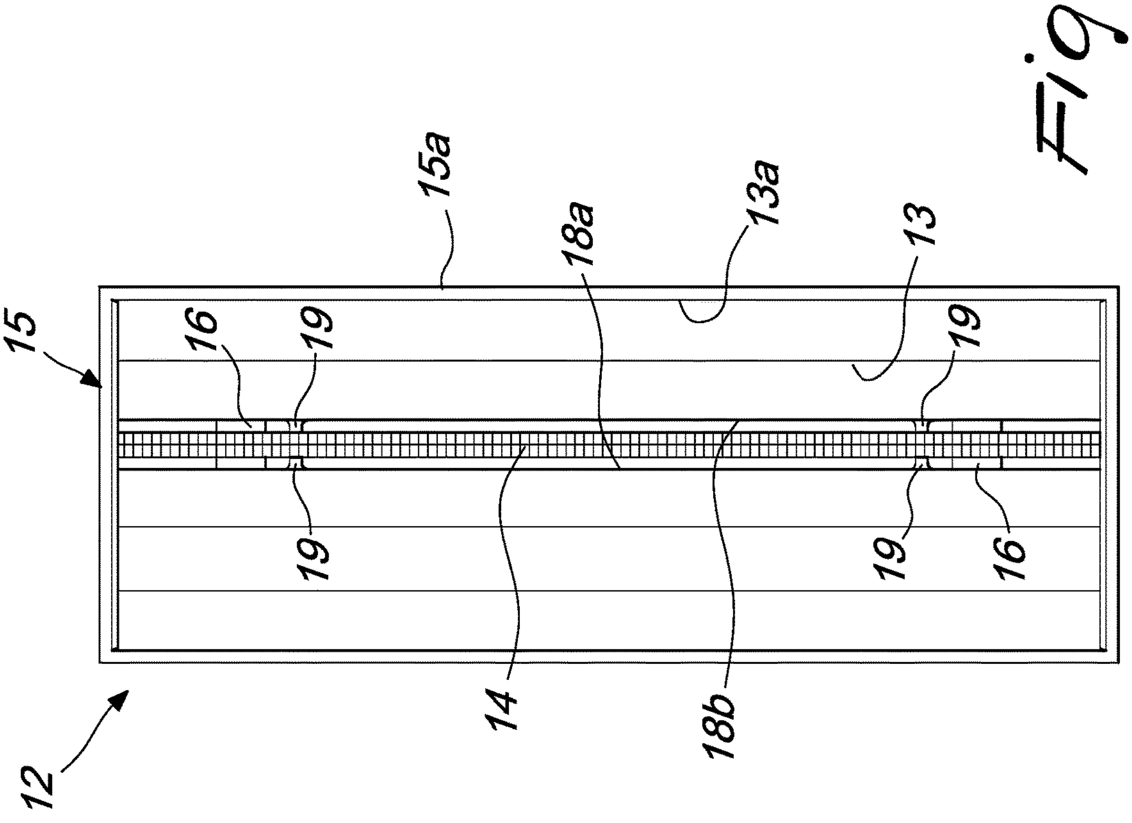
FIG. 4 is a front elevation view of the cutting device uncoupled from the cutting drum with the blade supporting element in the non-deformed condition.

With reference to the figures, the labeling machine according to the invention, generally designated by the reference numeral 1, comprises a conveyor 2 that moves containers 3 to be labeled along an advancement path.

For example, the conveyor 2 is constituted by a carousel 4, which rotates about its own axis and which has, on its peripheral region, a plurality of pans 5 for supporting the individual containers 3, with which the containers are rotated about their axes.

At least one labeling station 6 is arranged along the advancement path of the containers 3, and comprises an unreeling assembly 7, which is constituted, for example, by a pair of mutually opposite entrainment rollers 7*a*, 7*b* which is designed to take a label ribbon 8, on which a plurality of labels 8*a* are printed continuously, from a reel, not shown, making the label ribbon 8 pass, conveniently, through a tension adjustment device 9, as is known per se.

The labeling station 6 is further provided with a cutting drum 10, which can move by rotation about its axis and is designed to receive, so that it adheres to the lateral surface 10*a* thereof, the label ribbon 8.

To this end, on the lateral surface 10*a* of the cutting drum 10 there are holes 11 connected to air suction means, which are constituted, for example, by a vacuum pump 100, shown schematically, and which make it possible to hold the label ribbon 8 against the lateral surface 10*a* of the cutting drum 10.

In addition, at least one cutting device 12 is arranged along the perimeter of the cutting drum 10 and is provided with a respective suction chamber 13, which is open at the lateral surface 10*a* of the cutting drum 10 and internally accommodates a blade 14, which is designed to cut the label ribbon 8 and which lies, conveniently, on a radial plane with respect to the axis of the cutting drum 10.

More specifically, the suction chamber 13 can be connected to air suction means, for example constituted by the same vacuum pump 100 to which the holes 11 are connected, in such a way as to be able to attract the label ribbon 8 toward the inside of the suction chamber 13, so as to push it against the blade 14 and, as a consequence, cut the label ribbon 8.

According to the invention, the (or each) cutting device 12 comprises a respective blade supporting element 15, which is coupled, preferably removably, to the cutting drum 10 and supports the blade 14.

Also according to the invention, this blade supporting element 15 is elastically deformable in order to allow the coupling/uncoupling of the blade 14 to/from the blade supporting element 15.

As in the example shown, along the peripheral region of the cutting drum 10, there can optionally also be multiple cutting devices 12, which are arranged at a circumferential distance from each other that is at least equal to the length of the labels 8*a*.

In this case, at least one and, more preferably, each one of the cutting devices 12 is provided with a corresponding blade supporting element 15.

In greater detail, the blade supporting element 15 of each cutting device 12 is, advantageously, constituted by a box-like body 15*a*, which internally defines the suction chamber 13 of the corresponding cutting device 12 and to which the corresponding blade 14 is coupled.

This box-like body 15*a* is made of an elastically deformable material, such as, for example, rubber or the like, so that as a consequence of its deformation, it is possible to uncouple the blade 14 therefrom and extract it from the suction chamber 13.

In particular, in order to allow the coupling of the blade 14 to the box-like body 15*a*, on the box-like body 15*a* there is at least one locking pin 16 which removably engages a corresponding retention opening 17, which is defined in the blade 14 and, preferably, is elongated in shape, so as to facilitate the engagement thereof by the locking pin 16.

This locking pin 16 is, in practice, disengageable from the retention opening 17, so as to free the blade 14 from the coupling with the box-like body 15*a*, following an elastic deformation imposed on the box-like body 15*a* that is such as to produce the extraction of the locking pin 16 from the corresponding retention opening 17.

Preferably, on the box-like body 15*a* there are multiple locking pins 16, arranged mutually spaced apart along a direction that is substantially parallel to the axis of the cutting drum 10 and, therefore, to the longitudinal extension of the blade 14.

The locking pins 16 can be made in a single piece with the box-like body 15*a* or they can be constituted by inserts made of a different material from the material with which the box-like body 15*a* is provided, and which are partially embedded in the box-like body.

In more detail, the box-like body 15*a* is provided, inside the suction chamber 13, with a pair of mutually facing walls 18*a*, 18*b*, between which the blade 14 is inserted, at least partially.

In particular, the walls 18*a*, 18*b* are arrangeable further apart from each other as a consequence of the elastic deformation of the box-like body 15.

More specifically, the locking pins 16 are defined on at least one of the walls 18*a*, 18*b*, so that by virtue of the spacing apart of the walls 18*a*, 18*b*, which is achieved as a result of the elastic deformation of the box-like body 15*a*, it is possible to obtain the disengagement of the locking pins 16 from the retention openings 17 of the blade 14, so as to obtain the decoupling of the blade 14 from the box-like body 15*a*.

Advantageously, on the walls 18*a*, 18*b* there are abutment protrusions 19, which are designed to engage by resting against the opposite faces of the blade 14, in order to ensure the correct positioning of the blade 14 with respect to the box-like body 15*a*, in the active condition.

It must be noted that the box-like body 15 is coupled to the cutting drum 10 and, conveniently, it can be extracted from or inserted into a respective accommodation seat 20, which is defined peripherally in the cutting drum 10, by way of its sliding along a direction that is substantially parallel to the axis of the cutting drum.

It should be noted that, in order to allow the ingress of the label ribbon 8 inside the suction chamber 13, the box-like body 15*a* has, on its face intended to be directed outward, a suction opening 13*a*, which communicates with the suction chamber 13 and which lies, when the box-like body 15*a* is inserted in its accommodation seat 20, substantially at the lateral surface 10*a* of the cutting drum 10.

Conveniently, on the other side with respect to the suction opening 13*a*, the box-like body 15*a* is provided with a coupling portion 22, which is substantially dovetail-shaped and which removably engages a correspondingly-shaped portion 23 of the accommodation seat 20, in order to guide the sliding movement of the box-like body 15*a* in the direction parallel to the axis of the cutting drum 10 that allows its insertion into and extraction from the accommodation seat 20 and in order to block, at the same time, the possibility of the box-like body 15*a* to move in the radial direction, with respect to the axis of the cutting drum 10, when the box-like body 15*a* is inserted in the accommodation seat 20.

It must be noted that, as in the example shown, it is possible for each cutting device 12 of the cutting drum 10 to be flanked by a respective skid 24, which is arranged in position immediately before the accommodation seat 20 for the box-like body 15*a* of the corresponding cutting device 12, in the direction of rotation of the cutting drum 10, and which protrudes slightly from the lateral surface 10*a* of the cutting drum 10, in order to allow, in cooperation with a glue roller 25 positioned laterally to the cutting drum 10, the application of strips of glue on the trailing edge and on the leading edge of two consecutive labels 8*a* on the label ribbon 8, before the label ribbon itself is cut by the cutting device 12 adjacent thereto.

The operation of the labeling machine, according to the invention, is the following.

In an initial situation, a skid 24, on which the trailing edge and the leading edge of two consecutive labels 8*a* of the label ribbon 8 are resting, passes in front of the glue roller

25, so that the glue roller 25 can apply strips of glue on the trailing edge and on the leading edge of these labels 8*a*, and the unwinding assembly 7 feeds the label ribbon 8 to the cutting drum 10 at a speed that corresponds substantially to the peripheral speed of the cutting drum 10.

Subsequently, the unwinding assembly 7 feeds the label ribbon 8 to the cutting drum 10 at a speed slower than the peripheral speed of the cutting drum 10, so as to obtain the positioning, at the separation region between the two labels 8*a* on which the strips of glue have been applied, of the cutting device 12 immediately behind, in the direction of rotation of the cutting drum 10, the skid 24 that in the previous step was at the glue roller 25.

Once this cutting device 12 has reached the separation region between the two labels 8*a*, the label ribbon 8 is fed again by the unwinding assembly 7 at a speed that substantially corresponds to the peripheral speed of the cutting drum 10, and the suction chamber 13 of this cutting device 12 is connected to the air suction means, so as to attract the label ribbon 8 toward the inside of the suction chamber 13 and push it against the corresponding blade 14, so obtaining the cutting of the label ribbon 8, with separation therefrom of one of the labels 8*a* from the rest of the label ribbon 8.

At this point, the unwinding assembly 7 feeds the label ribbon 8 to the cutting drum 10 at a speed slower than the peripheral speed of the cutting drum 10, in so doing making the label 8*a* thus cut from the rest of the label ribbon 8 from which it has been separated move away, and until it is possible to position a skid 24 at the trailing edge and the leading edge of the next two consecutive labels 8*a* of the label ribbon 8, after which the unwinding assembly 7 will again feed the label ribbon 8 to the cutting drum 10 at a speed that substantially corresponds to the peripheral speed of the cutting drum 10.

Subsequently, by proceeding in its rotation, the cutting drum 10 will transfer the label 8*a* thus cut to the respective container 3 transported by the conveyor 2.

If it becomes necessary to replace one of the blades 14 of the cutting devices 12 of the cutting drum 10, with the machine stopped the operator uncouples the corresponding box-like body 15*a* from the cutting drum 10, by making it slide along a direction that is substantially parallel to the axis of the cutting drum 10, so as to obtain the extraction thereof from the corresponding accommodation seat 20.

Once the box-like body 15*a* has been extracted from its accommodation seat 20, the operator uncouples the blade 14 from the box-like body 15*a*, first making the box-like body 15*a* undergo an elastic deformation, with mutual spacing apart of the walls 18*a*, 18*b*, so as to obtain the disengagement of the locking pins 16 from the retention openings 17, and then extracting the blade 14 from the suction chamber 13, through the suction opening 13*a*.

At this point, while keeping the box-like body 15*a* in the deformed condition, a new blade 14 can be inserted in the suction chamber 13 of the box-like body 15*a* and arranged between the walls 18*a*, 18*b*, and then allowing the box-like body 15*a* to elastically return to the non-deformed condition so that the locking pins 16 can insert into the relative retention openings 17, thus obtaining the coupling of the blade 14 to the box-like body 15*a*.

At this point the box-like body 15*a* can again be coupled to the cutting drum 10 via the insertion thereof into the corresponding accommodation seat 20.

In practice it has been found that the invention fully achieves the intended aim and objects, in that, by virtue of the capacity for elastic deformation of the blade supporting elements of the cutting drum, it makes it possible to facilitate the operations to replace the blades of the cutting drum and make them extremely rapid.

It should further be noted that the capacity for elastic deformation of the blade supporting element and, more specifically, of the corresponding box-like body enables an easy cleaning of the suction chamber, in addition to ensuring a better seal thereof with the label ribbon.

Another advantage that it is possible to achieve by virtue of the invention consists of the fact that the coupling of the box-like body made of elastically deformable material with the corresponding accommodation seat defined in the cutting drum entails fewer problems from the point of view of pneumatic leaks, compared to the known art, in that the seal is adequately ensured by the deformability of the box-like body, without the need to use any additional gasket.

The invention thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102021000004820 from which this application claims priority are incorporated herein by reference.

The invention claimed is:

1. A labeling machine, comprising: a conveyor of containers to be labeled along an advancement path and at least one labeling station, which is arranged along said advancement path, said labeling station comprising an unreeling assembly for a label ribbon, on which a plurality of labels are printed continuously, and a cutting drum, which can move by rotation about an axis thereof and is designed to receive, so that it adheres to the lateral surface thereof, said label ribbon, at least one cutting device being arranged along a perimeter of said cutting drum and having a respective suction chamber, which is open at a lateral surface of said cutting drum and accommodates internally a blade, said suction chamber being connectable to air suction means, in order to attract said label ribbon toward an inside of said suction chamber and against said blade, in order to cut said label ribbon, wherein said at least one cutting device comprises a respective blade supporting element which is coupled to said cutting drum and supports said blade, said blade supporting element being elastically deformable in order to allow coupling/uncoupling of said blade to/from said blade supporting element;

wherein said blade supporting element comprises a box-like body which defines said suction chamber internally, said box-like body being made of an elastically deformable material.

2. The machine according to claim 1, wherein said blade supporting element is coupled to said cutting drum removably.

3. The machine according to claim 1, wherein at least one locking pin is defined on said box-like body and removably engages a corresponding retention opening defined in said blade, said at least one locking pin being disengageable from said retention opening following an elastic deformation imposed on said box-like body.

4. The machine according to claim 3, wherein said box-like body has, inside said suction chamber, a pair of mutually facing walls, said blade being inserted, at least partially, between said walls, said pair of mutually facing walls being arrangeable further apart from each other as a consequence of said elastic deformation.

5. The machine according to claim 4, wherein said at least one locking pin is defined on at least one of said pair of mutually facing walls.

6. The machine according to claim 4, further comprising, on said pair of mutually facing walls, abutment protrusions which engage by resting against opposite faces of said blade.

7. The machine according claim 1, wherein said box-like body is configured to be extracted from or inserted into a respective accommodation seat, which is defined peripherally in said cutting drum, by way of sliding along a direction that is substantially parallel to the axis of said cutting drum.

8. The machine according to claim 7, wherein said box-like body has, on a face thereof intended to be directed outward, a suction opening which communicates with said suction chamber and lies, with said box-like body inserted in said accommodation seat, substantially at the lateral surface of said cutting drum.

9. The machine according to claim 8, wherein said box-like body has, on an opposite side with respect to said suction opening, a coupling portion which is substantially dovetail-shaped and removably engages a correspondingly-shaped region of said accommodation seat.

* * * * *